No. 764,979.

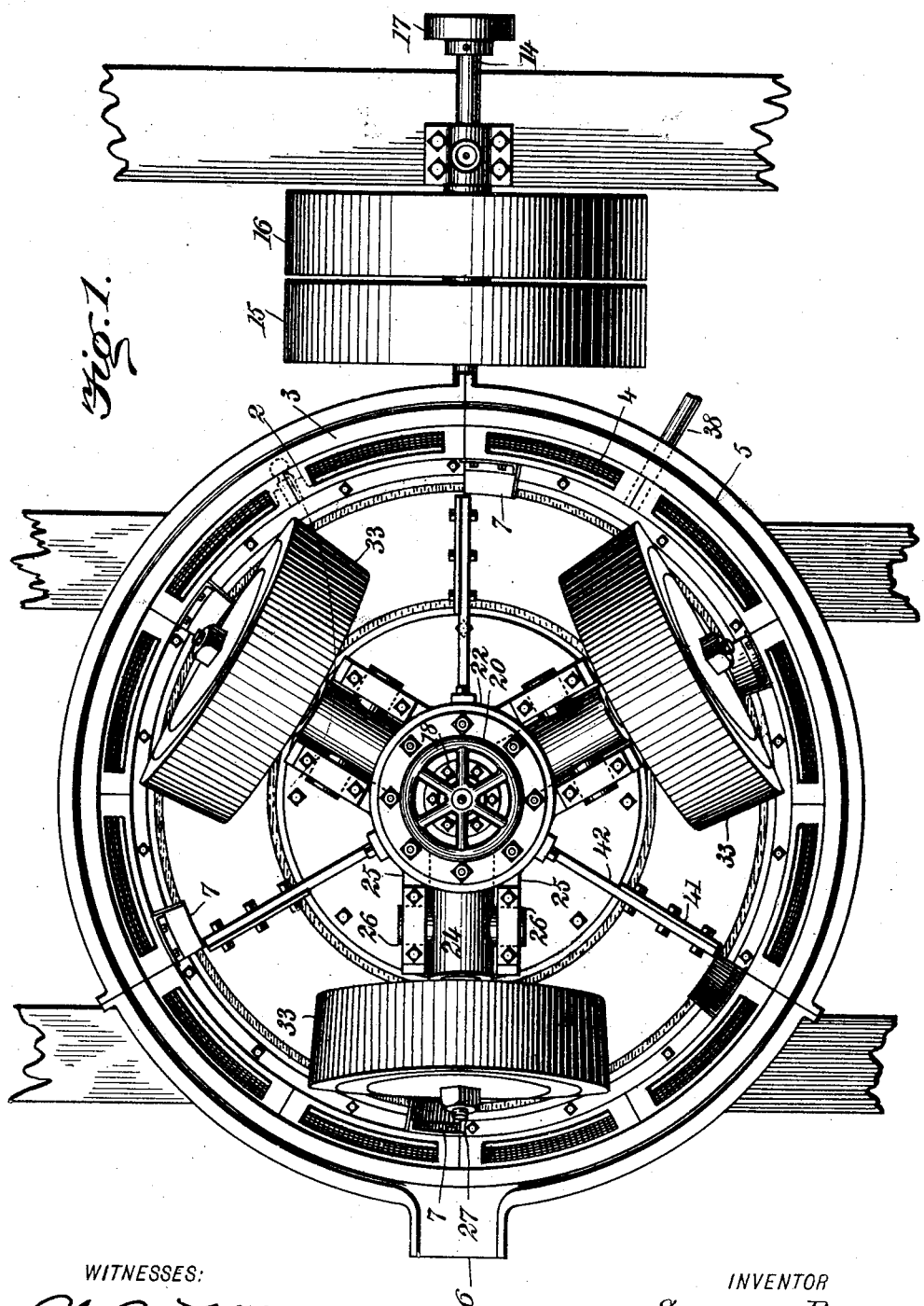

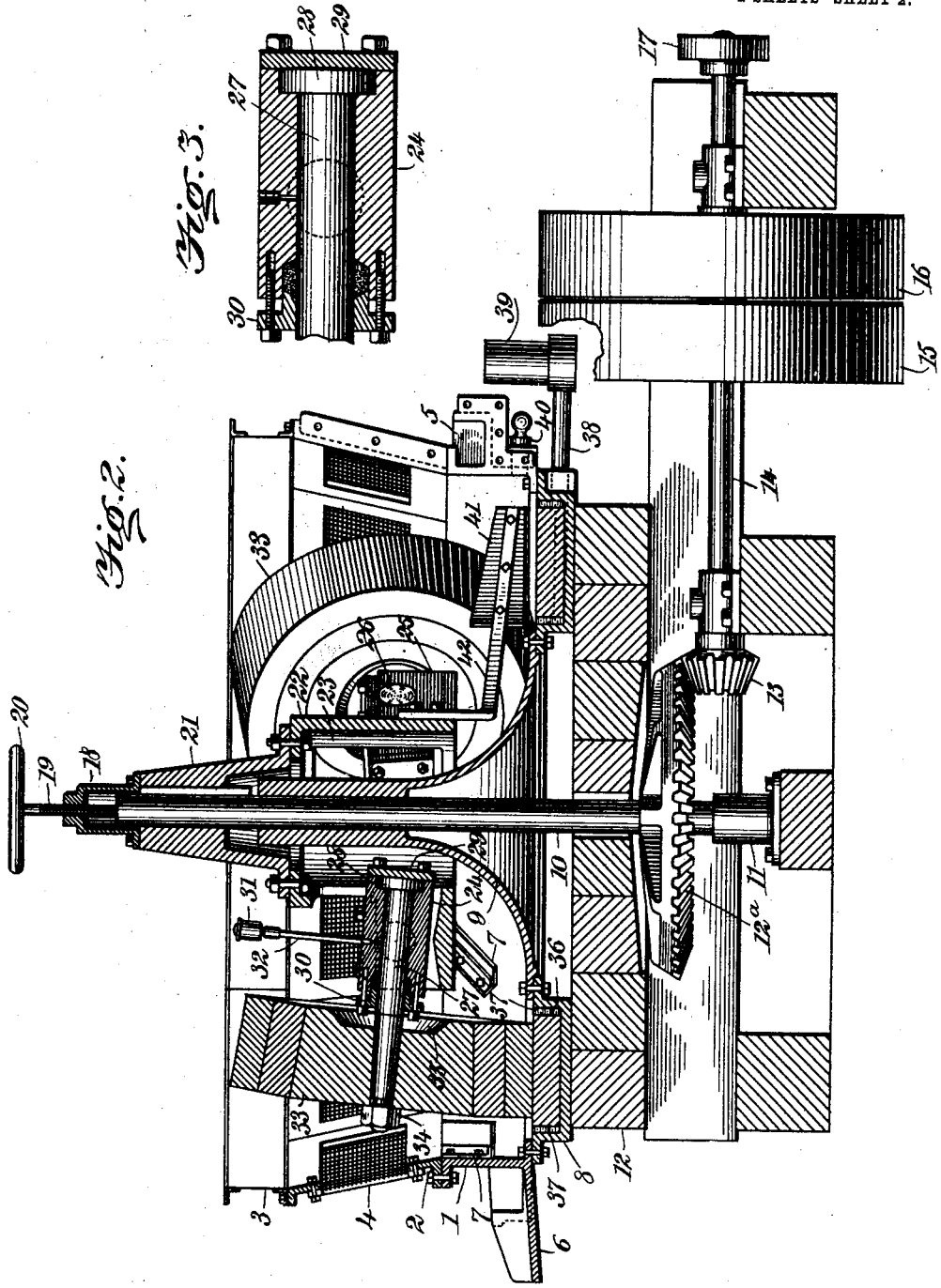

Patented July 12, 1904.

UNITED STATES PATENT OFFICE.

SAMSON BEER, OF BUTTE, MONTANA.

ORE-CONCENTRATOR.

SPECIFICATION forming part of Letters Patent No. 764,979, dated July 12, 1904.

Application filed April 3, 1903. Serial No. 150,886. (No model.)

*To all whom it may concern:*

Be it known that I, SAMSON BEER, a citizen of the United States, and a resident of Butte, in the county of Silverbow and State of Montana, have invented a new and Improved Ore-Mill, of which the following is a full, clear, and exact description.

This invention relates to improvements in mills for separating the values from gold or other ores, an object being to provide a device of this character that may be built to set up at a comparatively small cost, that may be easily operated by water-power, and in which there will be but little wear and tear.

I will describe an ore-mill embodying my invention and then point out the novel features in the appended claims.

Reference is to be had to the accompanying drawings, forming a part of this specification, in which similar characters of reference indicate corresponding parts in all the figures.

Figure 1 is a plan view of an ore-mill embodying my invention. Fig. 2 is a sectional elevation thereof, and Fig. 3 is a sectional view through one of the roller-bearing boxes.

The mill-pan comprises a lower ring-like portion 1, a central ring-like outwardly-inclined portion 2, and an upper ring-like portion 3. These several portions are provided with external annular flanges through which bolts may be passed to secure the parts together, and preferably each part will be made of separable segmental sections for convenience in shipping and setting up at a mill or at a mine. The portion 2 of the pan is provided with screens 4, through which tailings may pass into an annular trough 5 on the outer side of the pan portion 1 and discharge through a spout 6. On the inner side of the pan portion 1 are inwardly-extended wings 7, these wings being inclined downward and in the direction of travel of the crushing-rollers to be hereinafter described, and these wings are designed to somewhat agitate the ore and to force it toward the crushing-rollers. The bottom of the pan consists of an annular trough 8, having an exterior annular flange through which bolts pass to secure it to the pan portion 1. A continuation of the bottom consists of a bell-like plate 9, secured to the interior annular flange of the trough 8 and extended upward to nearly the top of the outer walls of the pan. A driving-shaft 10 extends up through a bell-like bottom portion 9, which forms an upper bearing for said shaft, the lower bearing being in a step 11. On the shaft, below a platform 12, on which the pan is supported, is a bevel-gear 12ª, meshing with a bevel-pinion 13 on a counter-shaft 14, having fast and loose pulleys 15 16, and also on this shaft 14 is a small pulley 17, from which a band may extend to drive an automatic feeder. At the upper end of the shaft 10 is a cap 18, in a tapped hole in which an adjusting-screw 19 is arranged, the said adjusting-screw resting on the top of the driving-shaft. For convenience in turning the screw 19 it is provided with a hand-wheel 20. By adjusting the screw 19 the crushing-rollers may be raised or lowered, as desired. Also surrounding the shaft 10 and designed to rotate therewith, but to move vertically thereof, is a downwardly and outwardly flared hub 21, the upper end of this hub being connected to the cap 18, while connected to the lower end is a cylindrical portion 22. This cylindrical portion is provided with openings 23, into which the inner ends of the shaft-bearing boxes 24 project. Extended outward from the sides of the openings 23 are cheek-pieces 25, in which the bearing-boxes 24 have trunnion-bearings 26. Roller-bearing shafts 27 are headed at the inner end, as indicated at 28, and the inner end of the box is recessed to receive the head, and when inserted a plate 29 is secured to the inner end of the bearing-box. At the outer end of the bearing-box is a stuffing-box 30, and an oil-cup 31 is provided for each bearing-box 24, the said cup having communication with the interior of the bearing-box through a tube 32, by means of which the cup is raised above the level of material in the pan.

It will be noted that the bearing-boxes 24 are normally inclined downward toward the driving-shaft 10. By this arrangement any excess of oil will gather at the inner end and be prevented from being forced out through the packing and stuffing boxes.

Mounted on each shaft 27 are crushing-rollers 33, preferably consisting of three parts, as clearly shown in Fig. 2. The portion of the shaft 27 passing through the rollers is tapped, and the rollers are secured and tightened thereon by means of a nut 34 on the outer end of the shaft. The inner side of the rollers around the shaft is provided with a recess or chamber 35, which provides a space for entering a tool for the purpose of tightening the stuffing-box or removing the same when necessary.

Arranged in the annular trough 8 is a track 36, which practically forms the under crusher, while the rollers 33 form the upper crushers. The inner edge of this track 36 is spaced from the inner wall of the trough 8, and the outer edge of said track is also spaced from the outer wall of the trough 8, and in these spaces mercury 37 is placed. The amalgam may be drawn off from both the spaces through a pipe 38 into the trap 39, as the spaces have communication through openings under the track, as indicated by dotted line opposite pipe 38 in Fig. 2.

For convenience in cleaning the pan it is provided with an opening at the bottom normally closed by a plug 40. Rearward of each roller 33 and extended across the track 36 is a plate 41, designed to agitate or scatter the ore evenly in front of the roller next following. This plate is secured to the cylindrical part 22 by means of angular arms 42.

In the operation the crushed ore with water is fed into the mill in any desired manner, preferably by the automatic feeder, as before described. The rollers carried around by the shaft 10 will finally pulverize the ore, and the values will amalgamate with the quicksilver, while the tailings will pass through the screens 4 or over the top of the pan.

It will be noted that the receiving-trough and discharge-spout are arranged at the lower portion of the pan or, in practice, about one foot from the bottom. The rollers are transversely tapered, with the smaller diameter inside, so that while moving around they are pressed outward, so as not to get loose on their shafts.

Having thus described my invention, I claim as new and desire to secure by Letters Patent—

1. In an ore-mill, a pan, a driving-shaft extending vertically through the pan, a hub surrounding the shaft, a cap on the hub, a screw operating in said cap and engaging the top of the shaft for moving the hub vertically, a cylindrical part attached to the hub and having side openings, cheek-pieces extended outward from the sides of the openings, bearing-boxes mounted to rock in said cheek-pieces, and rollers having their shaft-bearings in said bearing-boxes.

2. In an ore-mill, a pan, a driving-shaft extending vertically through the pan, a hub surrounding the shaft, a cap on the hub, a screw operating in said cap and engaging the top of the shaft for moving the hub vertically, a cylindrical part attached to the hub and having side openings, cheek-pieces extended outward from the sides of the openings, bearing-boxes mounted to rock in said cheek-pieces, and tapered rollers having their shaft-bearings in said bearing-boxes.

3. In an ore-mill, a pan, a driving-shaft extending vertically through the pan, a hub surrounding the shaft, a cap on the hub, a screw operating in said cap and engaging the top of the shaft for moving the hub vertically, a cylindrical part attached to the hub and having side openings, cheek-pieces extended outward from the sides of the openings, bearing-boxes mounted to rock in said cheek-pieces, and rollers having their shaft-bearings in said boxes, the said rollers being tapered and each consisting of a plurality of concentric sections.

In testimony whereof I have signed my name to this specification in the presence of two subscribing witnesses.

SAMSON BEER.

Witnesses:
WALTER J. ABBS,
LOUIS M. PRITCHARD.